US008557164B2

(12) United States Patent
Nabeshima et al.

(10) Patent No.: US 8,557,164 B2

(45) Date of Patent: Oct. 15, 2013

(54) LIQUID DISCHARGE HEAD AND MANUFACTURING METHOD OF THE SAME

(75) Inventors: Naozumi Nabeshima, Kawasaki (JP); Toru Yamane, Yokohama (JP); Takumi Suzuki, Yokohama (JP); Masahiko Kubota, Nakano-ku (JP); Tamaki Sato, Kawasaki (JP); Ryoji Kanri, Zushi (JP); Maki Hatta, Tachikawa (JP); Kazuhiro Asai, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 12/581,666

(22) Filed: Oct. 19, 2009

(65) Prior Publication Data

US 2010/0037460 A1 Feb. 18, 2010

Related U.S. Application Data

(63) Continuation of application No. 11/549,871, filed on Oct. 16, 2006, now Pat. No. 7,625,069.

(30) Foreign Application Priority Data

Oct. 17, 2005 (JP) ................................ 2005-301843

(51) Int. Cl.
*B29C 33/76* (2006.01)

(52) U.S. Cl.
USPC ........... 264/317; 264/642; 264/643; 264/651; 264/112; 264/241; 264/294; 264/212; 264/298; 264/299; 264/139; 264/401; 264/497

(58) Field of Classification Search
USPC ......... 264/317, 642, 643, 651, 112, 241, 294, 264/212, 298, 299, 139, 401, 497
See application file for complete search history.

(56) References Cited

U.S. PATENT DOCUMENTS

| | | | | |
|---|---|---|---|---|
| 5,916,542 | A * | 6/1999 | Fossati ........................... | 424/59 |
| 2003/0048328 | A1 * | 3/2003 | Inamoto et al. ................. | 347/44 |
| 2004/0056928 | A1 * | 3/2004 | Komuro et al. ................. | 347/65 |

FOREIGN PATENT DOCUMENTS

| | | |
|---|---|---|
| JP | 2006-007498 A | 1/2006 |

* cited by examiner

*Primary Examiner* — Jeffrey Wollschlager
*Assistant Examiner* — Stella Yi
(74) *Attorney, Agent, or Firm* — Canon USA Inc IP Division

(57) ABSTRACT

A liquid discharge head includes a substrate having an energy generating element configured to generate energy required to discharge liquid, a discharge port configured to discharge the liquid and provided in an opposed relationship to the energy generating element, a wall member defining a chamber adapted to store the energy required to discharge liquid the energy being generated by the energy generating element, a discharge portion defining a fluid path connecting the chamber and the discharge port, a supply path facilitating supplying the liquid into the chamber, and a pair of hollow portions provided in the wall member, wherein the hollow portions oppose each other and sandwich at least the entire discharge port in a direction from the discharge port to the substrate, and the hollow portions are independent of the chamber.

2 Claims, 7 Drawing Sheets

LIQUID DISCHARGE HEAD AND MANUFACTURING METHOD OF THE SAME

CROSS-REFERENCE TO RELATED APPLICATIONS

This application is a divisional of U.S. patent application Ser. No. 11/549,871 filed Oct. 16, 2006, which claims priority from Japanese Patent Application No. 2005-301843 filed Oct. 17, 2005, all of which are hereby incorporated by reference herein in their entirety.

BACKGROUND OF THE INVENTION

1. Field of the Invention

The present invention relates to a liquid discharge head capable of discharging liquid, and more particularly to an inkjet recording head configured to discharge ink droplets onto a recording medium to perform a recording operation. Furthermore, the present invention relates to a method for manufacturing the liquid discharge head.

2. Description of the Related Art

A general inkjet recording head is equipped with discharge energy generating elements to discharge ink droplets. The discharge energy generating element is constructed from, for example, a heater or other electrothermal transducer, or a piezoelectric element or other piezoelectric type device. The discharge amount of an ink droplet can be controlled based on an electric signal supplied to the discharge energy generating element.

The demand for high resolution recording images has rapidly increased due to widespread use of the Internet and digital cameras. To realize such high resolution recording images, the inkjet recording heads are required to have smaller-size discharge ports capable of discharging fine ink droplets.

However, if the discharge port has a smaller diameter in the level of several μm, the flow resistance of liquid flowing in the discharge portion is extremely high. so that the discharge efficiency deteriorates.

To solve this problem, a conventional inkjet recording head discussed in U.S. Pat. No. 6,984,026 includes a first discharge portion including a discharge port and a second discharge portion having a larger cross section perpendicular to the flow direction compared to the discharge port.

The proposed conventional inkjet recording head can reduce the flow resistance of the fluid flowing toward the discharge port and accordingly can improve the discharge efficiency.

However, in the discharge test conducted based on samples of the head discussed in U.S. Pat. No. 6,984,026, the inventors of the present invention have confirmed some samples undesirable in discharge characteristics (e.g., in the discharge direction or in the discharge amount), in rare cases, depending on the shape (e.g., the size of discharge port diameter) or the material.

In the test, the inventors of the present invention have checked the head samples having undesirable discharge characteristics and found deformation, at least partly, in the vicinity of a member surrounding the discharge port.

Furthermore, as a result of study and analysis, the inventors of the present invention have confirmed the distortion caused by stress acting on the member surrounding the discharge port.

More specifically, a channel forming member of the inkjet recording head is directly brought into contact with the ink for a long time. Therefore, the channel forming member may cause swelling or thermal expansion depending on the material. The generated stress tends to cause deformation of the discharge portion because the discharge portion is thin and weak compared to other portion.

SUMMARY OF THE INVENTION

The present invention is directed to a liquid discharge head and a method of manufacturing the same.

The liquid discharge head (e.g., an inkjet recording head) of the present invention has smaller-size discharge ports which can relax the stress if caused due to swelling or thermal expansion and also can reduce deformation of a discharge portion.

According to an aspect of the present invention, a liquid discharge head includes: a substrate having an energy generating element configured to generate energy required to discharge liquid; a discharge port configured to discharge the liquid and provided in an opposed relationship to the energy generating element; a wall member defining a chamber adapted to store the energy required to discharge liquid, the energy being generated by the energy generating element; a discharge portion defining a fluid path connecting the chamber and the discharge port; a supply path facilitating supplying the liquid into the chamber; and a pair of hollow portions provided in the wall member, wherein the hollow portions oppose each other and sandwich at least the entire discharge port in a direction from the discharge port to the substrate, and the hollow portions are independent of the chamber.

Furthermore, another aspect of the present invention provides a method for manufacturing a liquid discharge head including a substrate having an energy generating element configured to generate energy required to discharge liquid, a discharge port configured to discharge the liquid and provided in an opposed relationship to the energy generating element, a chamber adapted to store the energy required to discharge liquid which is generated by the energy generating element, a discharge portion configured defining a fluid path connecting the chamber and the discharge port, and a supply path facilitating supplying the liquid into the chamber. The manufacturing method includes the steps of: forming a removable material layer on the substrate; patterning the removable material layer to form a mold member at a position opposing a side wall of a spatial region where the chamber is formed, wherein the side wall is defined with respect to a supply direction of the liquid; forming a coating resin layer on the mold member; forming a portion where the mold member is uncovered by the liquid coating resin layer, at a region opposing the supply path of the chamber in the supply direction of the liquid; and removing the mold member via the portion where the mold member is uncovered.

Further features of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE EMBODIMENTS

Figure 1:
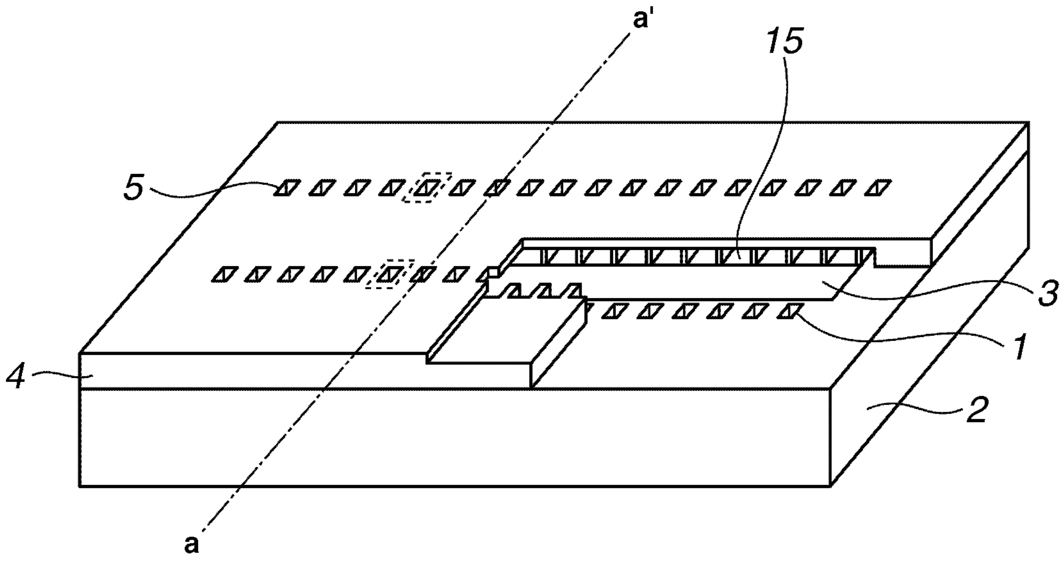
FIG. 1 is a perspective view illustrating one example of an inkjet recording head according to an exemplary embodiment.

The following description of exemplary embodiments is merely illustrative in nature and is in no way intended to limit the invention, its application, or uses.

Processes, techniques, apparatus, and materials as known by one of ordinary skill in the art may not be discussed in detail but are intended to be part of the enabling description where appropriate.

For example, a detailed manufacturing system may not be discussed in detail. However the manufacturing system as known by one of ordinary skill in the relevant art is intended to be part of the enabling disclosure herein where appropriate.

It is noted that throughout the specification, similar reference numerals and letters refer to similar items in the following figures, and thus once an item is defined in one figure, it may not be discussed for following figures.

Exemplary embodiments will be described in detail below with reference to the drawings.

For example, the present invention is applicable to an inkjet recording head. However, the present invention is not limited to the inkjet recording head and is applicable to formation of a bio chip or printing of an electronic circuit. First, an exemplary inkjet recording head will be explained.

FIG. 1 is a perspective view illustrating an inkjet recording head according to an exemplary embodiment.

The inkjet recording head according to the present exemplary embodiment includes two rows of plural ink discharge energy generating elements 1 (i.e., heat-generating resistance members) disposed at predetermined pitches on a silicon (Si) substrate 2. An ink supply port 3 can be formed on the substrate 2 by anisotropic etching the Si material. The ink supply port 3 is positioned between two rows of the ink discharge energy generating elements 1.

A channel forming member 4, positioned on the substrate 2, has numerous ink discharge ports 5 each opened in an opposed relationship to a corresponding ink discharge energy generating element 1. The channel forming member 4 further includes numerous ink channels 15, each supplying ink from the ink supply port 3 to a corresponding ink discharge port 5.

The inkjet recording head has a discharge surface on which the ink supply ports 3 are formed. The discharge surface of the inkjet recording head is disposed so as to face a recording surface of a recording medium.

To perform a recording operation, the inkjet recording head can discharge an ink droplet from each ink discharge port 5 toward a recording medium by causing the ink discharge energy generating element 1 to generate the pressure applied to the ink supplied via the ink supply port 3 and stored in the ink channel 15.

Inkjet recording heads can be installed on printers, copying machines, facsimiles, printer-equipped word processors, and also on industrial recording devices combined with various processing devices.

Next, a practical structure of the inkjet recording head according to an exemplary embodiment will be described below in more detail with reference to FIGS. 2A to 2D.

Figure 2A:
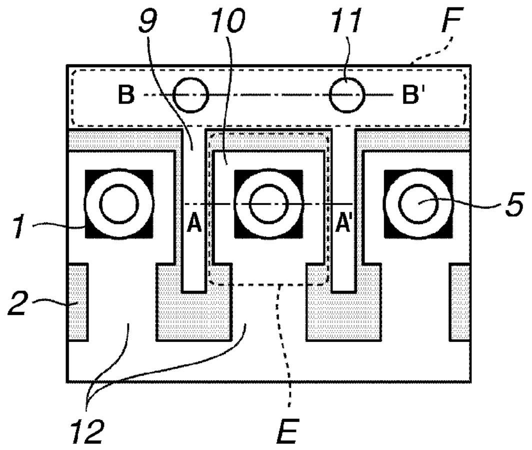
FIGS. 2A to 2D are views illustrating practical examples of the inkjet recording head according to exemplary embodiments.
Figure 2B:
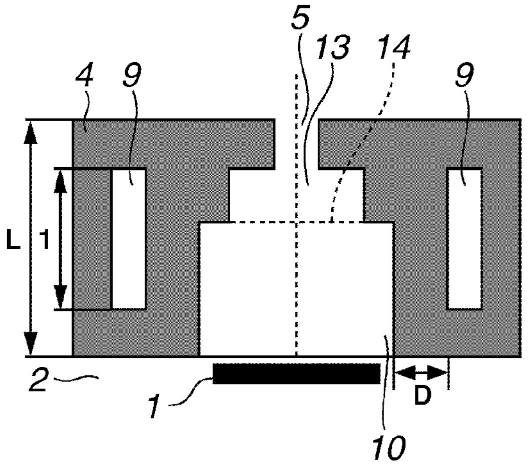
Figure 2C:
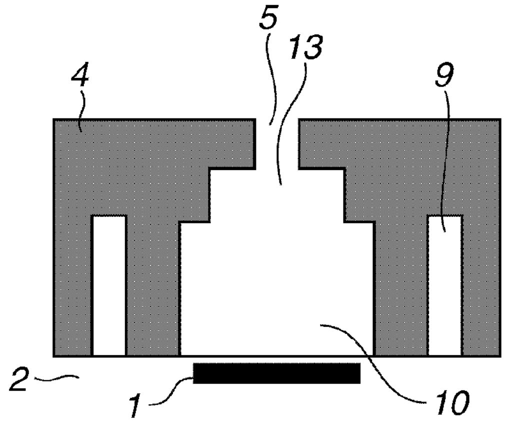
Figure 2D:
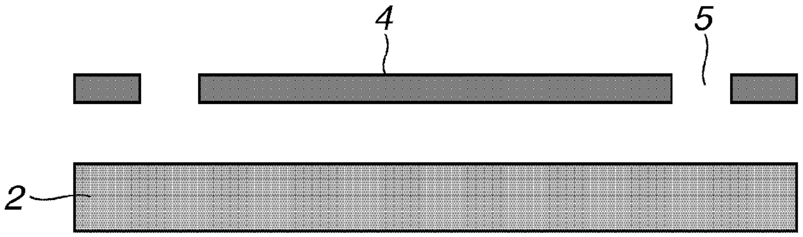

FIG. 2A is a perspective plan view illustrating a discharge port side of the inkjet recording head according to an exemplary embodiment. FIG. 2B is a cross-sectional view illustrating one example of the inkjet recording head taken along a line A-A' of FIG. 2A. FIG. 2C is a cross-sectional view illustrating a later-described example of the inkjet recording head taken along the line A-A' of FIG. 2A. FIG. 2D is a cross-sectional view illustrating the inkjet recording head taken along a line B-B' of FIG. 2A.

As shown in FIG. 2A, the inkjet recording head includes hollow portions 9 formed in a wall member defining a chamber 10. The hollow portions 9 are independent of the chamber 10 and a supply path 12. The chamber 10 and at least part of the supply path 12 are sandwiched between a pair of opposing hollow portions 9.

It is more preferable when the entire part of the chamber 10 is positioned in a region (indicated by a dotted rectangular frame E shown in FIG. 2A) sandwiched between the hollow portions 9. The hollow portions 9 are communicating with the external space via a communication port 11 provided at a position (indicated by a dotted rectangular frame F shown in FIG. 2A) opposing the supply path 12. However, the hollow portions 9 can be sealed, that is, the communication port 11 can be dispensed with. As can be seen in FIG. 2A, at least one hollow portion 9 can be provided between two discharge portions 13, and therefore between two discharge ports 5. At least the entire part of the discharge port 5 is positioned in a region (indicated by a dotted rectangular frame E shown in FIG. 2A) sandwiched between the hollow portions 9. The chamber 10 is an area where at least the energy generating element 1 can be enclosed in a direction from the discharge port to the substrate.

According to the exemplary embodiment shown in FIG. 2B, the chamber 10 is provided in an opposed relationship to a corresponding energy generating element 1. The chamber 10 and a discharge portion 13 are communicating with each other. The discharge portion 13 has an ink discharge port 5.

As understood from the cross-sectional view of FIG. 2B, the inkjet recording head has a shoulder portion (indicated by a dotted line in FIG. 2B) that defines an opening 14 of the discharge portion 13 at the side facing to the substrate 2. In other words, the opening 14 defines a boundary between the discharge portion 13 and the chamber 10.

Figure 3:
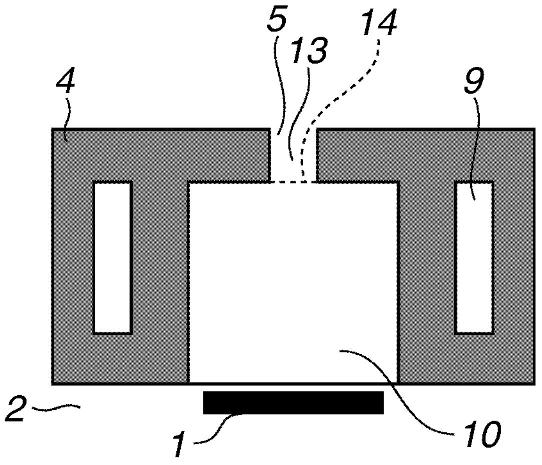
FIG. 3 is a cross-sectional view illustrating one example of an inkjet recording head according to an exemplary embodiment.

The discharge portion 13 extends from the opening 14 to the ink discharge port 5. The discharge portion 13 can function as a fluid passage connecting the chamber 10 and the ink discharge port 5. An example shown in FIG. 3 has a similar arrangement.

According to the example shown in FIG. 2C, each hollow portion 9 extends vertically from the substrate 2 to the height level of the opening 14 of the discharge portion 13.

Figure 4:
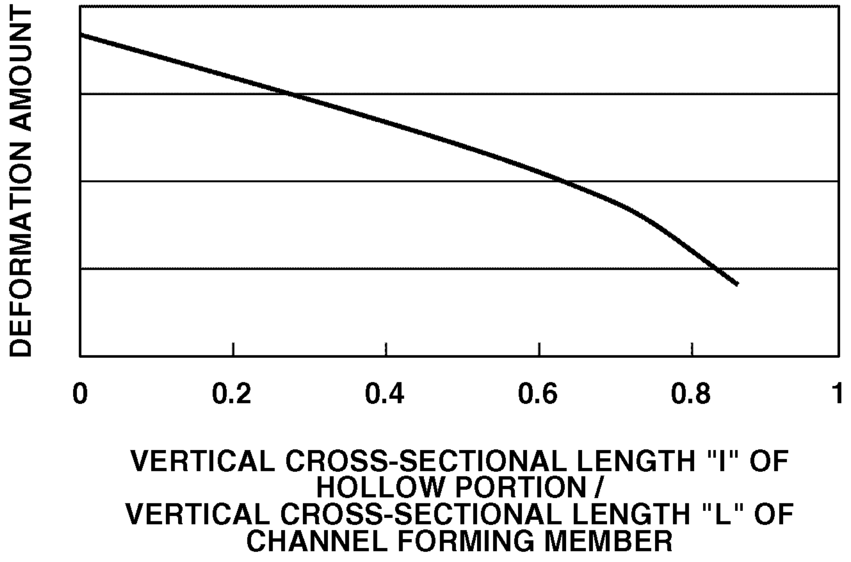
FIG. 4 is a graph showing one example of the deformation amount of a discharge port in relation to the ratio of the hollow portion to the channel forming member in a vertical cross-sectional length perpendicular to a substrate.

FIG. 4 shows the relationship between a size ratio l/L and a deformation amount of the ink discharge port 5, where "L" represents the cross-sectional length of the channel forming member 4 (extending from the ink discharge port 5 to the substrate 2) and "l" represents the vertical cross-sectional length of the hollow portions 9 (refer to FIG. 2B).

As understood from FIG. 4, when the ratio of the hollow portion 9 relative to the channel forming member 4 is large, the deformation amount of the ink discharge port 5 is small.

Thus, a large stress relaxation effect can be obtained by providing the hollow portions 9 having a relatively large area extending vertically in the direction from the substrate 2 to the ink discharge port 5.

According to the study and analysis conducted by the inventors of the present invention, the channel forming member 4 can be sufficiently thin at a region (refer to D shown in FIG. 2B) intervening between the chamber 10 and the hollow portion 9 as long as a sufficient bonding strength is obtainable between the channel forming member 4 and the substrate 2.

When the channel forming member 4 defining the chamber 10 and the ink discharge port 5 is made of a high polymer material, the channel forming member 4 may swell due to moisture absorption or water absorption during the use of the head. When the channel forming member 4 is made of a metal material, the channel forming member 4 will cause a thermal expansion. The generated stress acts on a region surrounding the chamber 10 in which the ink fluid is stored.

The channel forming member 4 has lower rigidity in the vicinity of the ink discharge port 5 compared to other regions. Thus, the ink discharge port 5 may deform due to a relatively large stress acting thereon. The deformed ink discharge port 5 may cause abnormal discharge of a liquid droplet in the discharge amount or in the discharge direction. Thus, the print quality will deteriorate.

However, the present exemplary embodiment can solve the above-described problem by forming the hollow portions 9 in the channel forming member 4 so as to provide a low-rigidity portion comparable to (or lower than) the ink discharge port 5. The hollow portions 9 can absorb the stress acting on the region surrounding the ink discharge port 5. In other words, the stress applied to the region surrounding the ink discharge port 5 can be decentralized.

Accordingly, the above-described exemplary embodiment can reduce the deformation of the ink discharge port 5, and accordingly can reduce undesirable changes in the discharge amount or in the discharge direction of liquid droplets. The print quality can be improved.

Another structure capable of decentralizing the stress acting on the discharge portion is a groove structure formed by forming the channel forming member from the discharge port side to the substrate side. However, the groove structure cannot provide a surface effectively connecting and constraining neighboring discharge ports. Thus, employment of the groove structure is substantially dependent on the strength of the channel forming member.

From the similar reasons, the inkjet recording head according to the present exemplary embodiment has the communication port 11 connecting the hollow portions 9 to the external space provided at the downstream side of the chamber 10 in the supply direction of the fluid.

Furthermore, according to the example shown in FIG. 2B, the hollow portions 9 are symmetrically formed about the center line (i.e., axial line) of the chamber 10 (refer to a bold dotted line shown in FIG. 2B). The stress acting on the region surrounding the ink discharge port 5 can be uniformly relaxed. If the stress is unevenly decentralized, significant stress may act on an unexpected portion.

FIG. 2C is a cross-sectional view illustrating a modified example of the exemplary embodiment shown in FIG. 2B. According to the example shown in FIG. 2C, the lower end surface of each hollow portion 9 is formed by the substrate 2 when the bottom of the ink discharge port 5 is viewed from the substrate 2. Even in the arrangement shown in FIG. 2C, the stress relaxation effect can be sufficiently obtained.

In the above description, the discharge portion 13 shown in FIG. 2B causes a stepwise change in the cross section parallel to the substrate 2. However, the present invention is not limited to the example of FIG. 2B. For example, the discharge portion 13 can be configured into a shape shown in FIG. 3.

Next, a method for manufacturing the inkjet recording head according to an exemplary embodiment will be described with reference to FIGS. 5A to 5G and FIGS. 6A to 6G. FIGS. 5A to 5G are cross-sectional views taken along a line a-a' of FIG. 1. FIGS. 6A to 6G are cross-sectional views taken along a line A-A' of FIG. 2A.

Figures 5A, 5B, 5C, 5D, 5E, 5F, 5G:
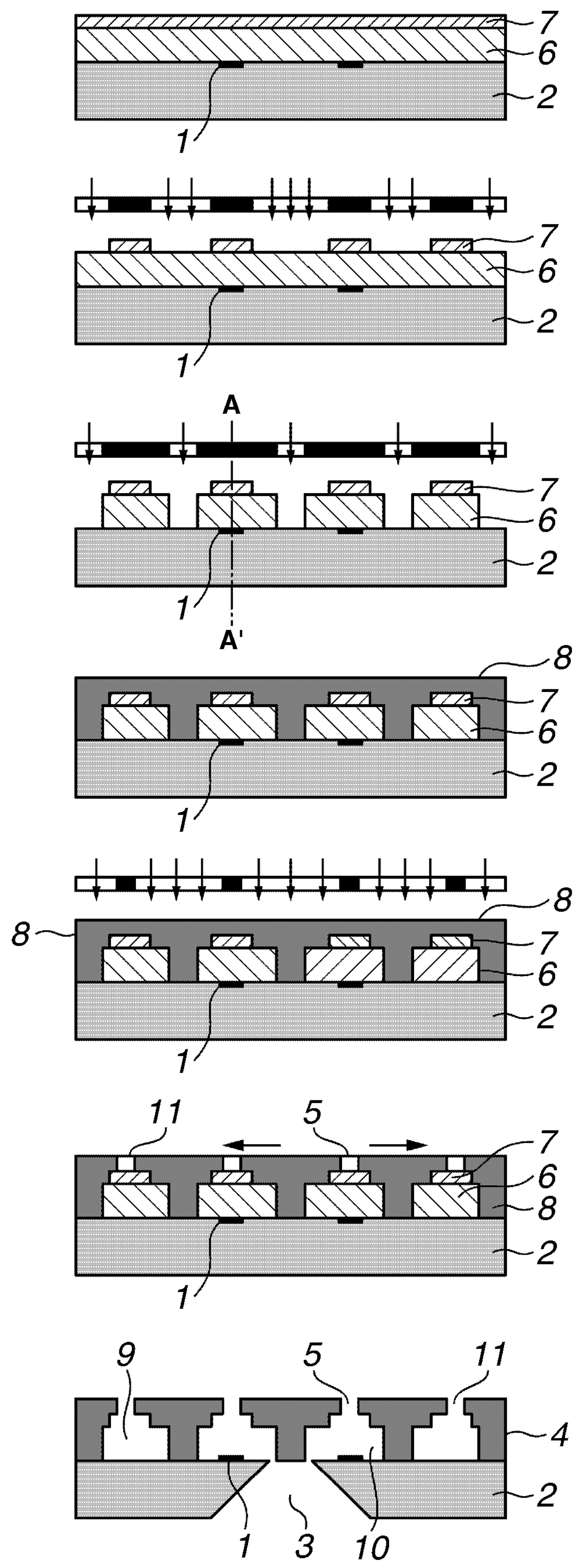
FIGS. 5A to 5G are cross-sectional views illustrating one example of a manufacturing method for the inkjet recording head according to an exemplary embodiment.
Figure 6A:
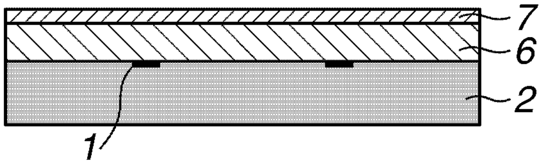
FIGS. 6A to 6G are cross-sectional views illustrating one example of the manufacturing method for the inkjet recording head according to the exemplary embodiment.

First, as shown in FIGS. 5A and 6A, a prepared Si substrate 2 has a plurality of discharge energy generating elements 1 (i.e., electrothermal transducers) formed thereon. A first layer 6 and a second layer 7 are continuously formed on the substrate 2 by spin coating.

Both the first layer 6 and the second layer 7 can be formed by irradiating a fusible resin with deep-UV light (hereinafter, referred to as DUV light). When the fusible resin is irradiated with the DUV light, molecular connections of the resin can be destroyed and the resin can melt. The DUV light can be ultraviolet light having the wavelength equal to or less than 300 nm.

The liquid used for forming the first layer 6 can be cyclohexanone solvent containing iodized polymethyl isopropenyl ketone (PMIPK). The liquid used for forming the second layer 7 can be cyclohexanone solvent containing dissolved binary copolymer (P (MMA-MAA)=90~70:10~30) that can be obtained from radical polymerization of methyl methacrylate (MMA) and methacrylic acid (MAA).

Figure 6B:
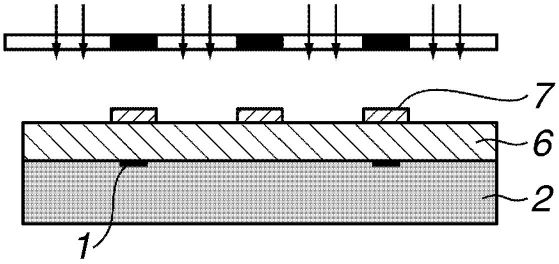

Then, as shown in FIGS. 5B and 6B, using the exposure apparatus capable of emitting the DUV light, the second layer 7 is exposed to the DUV light having the wavelength of 210 nm to 260 nm and then developed to form a desired channel pattern on the second layer 7. The pattern of the second layer 7 can be used as a mold required to form a cavity in an ink channel wall.

The second layer 7 and the first layer 6 are greatly differentiated in the sensitivity relative to the NUV light in the wavelength range from 210 nm to 260 nm. Thus, only the second layer 7 is patterned while leaving the first layer 6 unchanged.

Figure 6C:
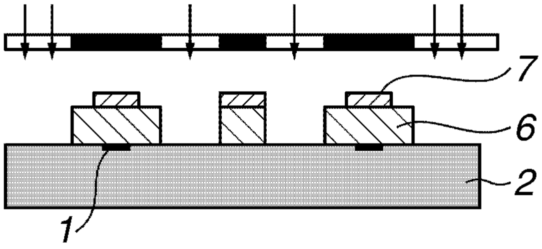

Subsequently, as shown in FIGS. 5C and 6C, using the above-described exposure apparatus, the first layer 6 is exposed to the near-UV light (hereinafter, referred to as “NUV light”) having the wavelength of 260 nm to 330 nm. Thus, the first layer 6 is developed to form a desired channel pattern and a mold pattern of the hollow portions 9 on the first layer 6.

The following method can be used to form the hollow portions 9 surrounding the chamber 10, and separated by the substrate 2 and the channel forming member 4 as shown in FIG. 2B.

Figure 7A:
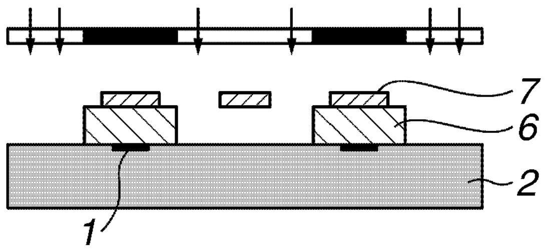
FIGS. 7A to 7B is a cross-sectional view illustrating one example of the manufacturing method for the inkjet recording head according to the exemplary embodiment.

More specifically, as shown in FIG. 7A, the lower layer is exposed to the light via the second layer 7 and subsequently developed to leave a portion where the first layer 6 is not partly present under the second layer 7, so that part of the second layer 7 is positioned in the hollow space.

Figure 7B:
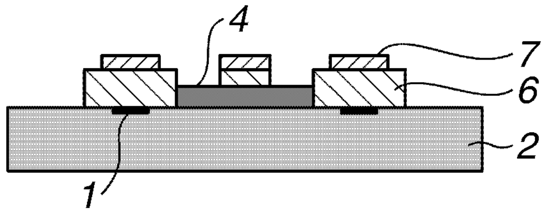

The influence of the exposure given to the second layer 7, in the exposure applied to the first layer 6 via the second layer 7, can be controlled by adequately selecting a combination of resins having mutually different light-sensitive wavelength regions as described above. In addition, it is also possible that the first layer 6 and the second layer 7 are disposed and patterned to form a mold pattern after the channel forming member 4 is first formed to separate the hollow portions 9 and the substrate 2 as shown in FIG. 7B. In this case, the hollow portions 9 are formed which reach a height of the discharge portion 13 from the chamber 10.

Figure 6D:
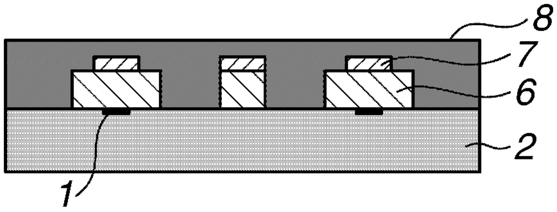

Next, as shown in FIGS. 5D and 6D, the resin compound having the following composition is mixed with triethanolamine which is added by 13 mol % of SP-170 and then dissolved in the methyl isobutyl ketone/xylene mixture solvent so as to have the concentration of 60 wt %.

Then, the dissolved resin compound is applied, by the spin coating method, onto the hollow portion molding material and the ink channel molding material which are defined by the first layer 6 and the second layer 7. Thus, a coating resin layer 8 is formed on the first layer 6 and the second layer 7.

| NAME | RESIN COMPOSITION | WEIGHT PART |
|---|---|---|
| EHPE-3158 | Daicel Chemical Industries, Ltd. | 100 |
| A-187 | Nippon Unicar Company Limited | 5 |
| SP-170 | ADEKA CORPORATION | 2 |

The above-described exemplary embodiment uses the coating resin layer 8 having the above-described resin composition. However, it is possible to use other appropriate resins, such as MicroChem SU-8 or other thick film resists.

Figure 6E:
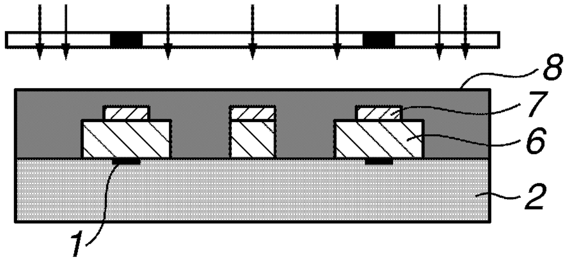

Then, as shown in FIGS. 5E and 6E, using the CANON MPA-600 super, the coating resin layer 8 is exposed to the light to form the ink discharge port 5 and the communication port 11 connected to the external space.

Figure 6F:
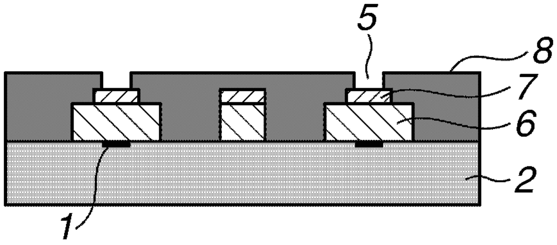

Then, as shown in FIGS. 5F and 6F, the pattern of the ink discharge port 5 is formed by performing PEB and developing. At the same time, the communication port 11 is formed to form the hollow portions 9. The communication port 11 is required to remove the first layer 6 and the second layer 7. The communication port 11 is formed at a downstream region (indicated by arrows shown in FIG. 5F) in the supply direction compared to a portion where the channel is formed.

Next, as shown in FIG. 5G, the silicon is subjected to anisotropic etching using TMAH to form the ink supply port 3. The ink supply port 3 is an opening portion required to supply ink.

Figure 6G:
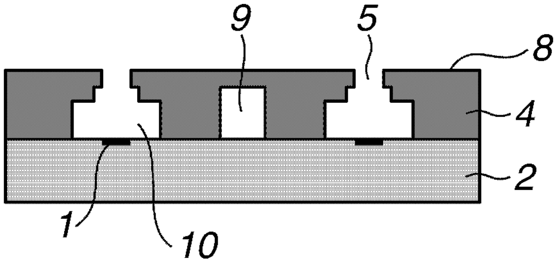

Then, as shown in FIGS. 5G and 6G, the entire surface is irradiated using the USHIO CE-9000. Under an immersed condition in the methyl lactate with ultrasonic wave imparted, the fusible first and second layers 6 and 7 are melted and removed so as to form a mold pattern of the hollow portions and the ink channel pattern.

Finally, the obtained body is heated at a temperature of 200° C. for one hour to completely harden the coating resin layer 8, thereby obtaining the channel forming member 4.

Additionally, an electric connection (not shown) necessary to drive each ink discharge energy generating element 1 is provided on the channel forming member 4, before completing the inkjet recording head.

According to the result of measurement using a shape measuring machine, it is confirmed that the inkjet recording head manufactured according to the above-described exemplary embodiment can reduce the deformation of the ink discharge port 5, which may be caused by the swelling of ink or heat, compared to the conventional inkjet recording head.

That is, the inkjet recording head according to the exemplary embodiment has hollow portions formed in a wall surface member defining the chamber. The hollow portions are independent of the channel of liquid formed in the channel forming member.

Thus, the inkjet recording head according to the exemplary embodiment can relax the stress which may be generated due to swelling or thermal expansion of the channel forming member. As a result, the inkjet recording head according to the exemplary embodiment can reduce or eliminate the deformation of the discharge port, and can reduce the differences in discharge characteristics (i.e., in the discharge amount or in the discharge direction) of a liquid droplet.

Therefore, the exemplary embodiment can provide an inkjet recording head capable of assuring satisfactory recording quality even if the discharge ports have reduced port diameters.

Furthermore, according to a long-lasting print endurance test, the inkjet recording head having the hollow portions according to the above-described exemplary embodiment showed stable discharge characteristics compared to the conventional inkjet recording head.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

What is claimed is:

1. A method for manufacturing a liquid discharge head including a substrate having an energy generating element configured to generate energy required to discharge liquid, a discharge port configured to discharge the liquid and provided in an opposed relationship to the energy generating element, a chamber adapted to store the energy required to discharge liquid which is generated by the energy generating element, a discharge portion configured defining a fluid path connecting the chamber and the discharge port, and a supply path facilitating supplying the liquid into the chamber, the method comprising:

forming a removable material layer including a first layer directly disposed on the substrate and a second layer disposed on the first layer, wherein the first layer and the second layer are formed by a positive light-sensitive resin;

exposing the first layer to the light via the second layer;

developing and removing the exposed first layer so as to leave a portion where the first layer is partly not present between the second layer and the substrate;

forming a coating resin layer on the second layer;

forming a portion where the second layer is uncovered by the coating resin layer, at a region opposing the supply path of the chamber in the supply direction of the liquid; and removing the second layer via the portion where the second layer is uncovered so as to form a hollow portion to which liquid to be discharged does not flow and having a bottom surface apart from the substrate.

2. The method according to claim 1, wherein a light-sensitive wavelength region of the first layer is different from a light-sensitive wavelength region of the second layer.

* * * * *